L. CORDIER.
MICROMETER HEAD.
APPLICATION FILED FEB. 26, 1914.
1,105,549.
Patented July 28, 1914.
3 SHEETS—SHEET 1.
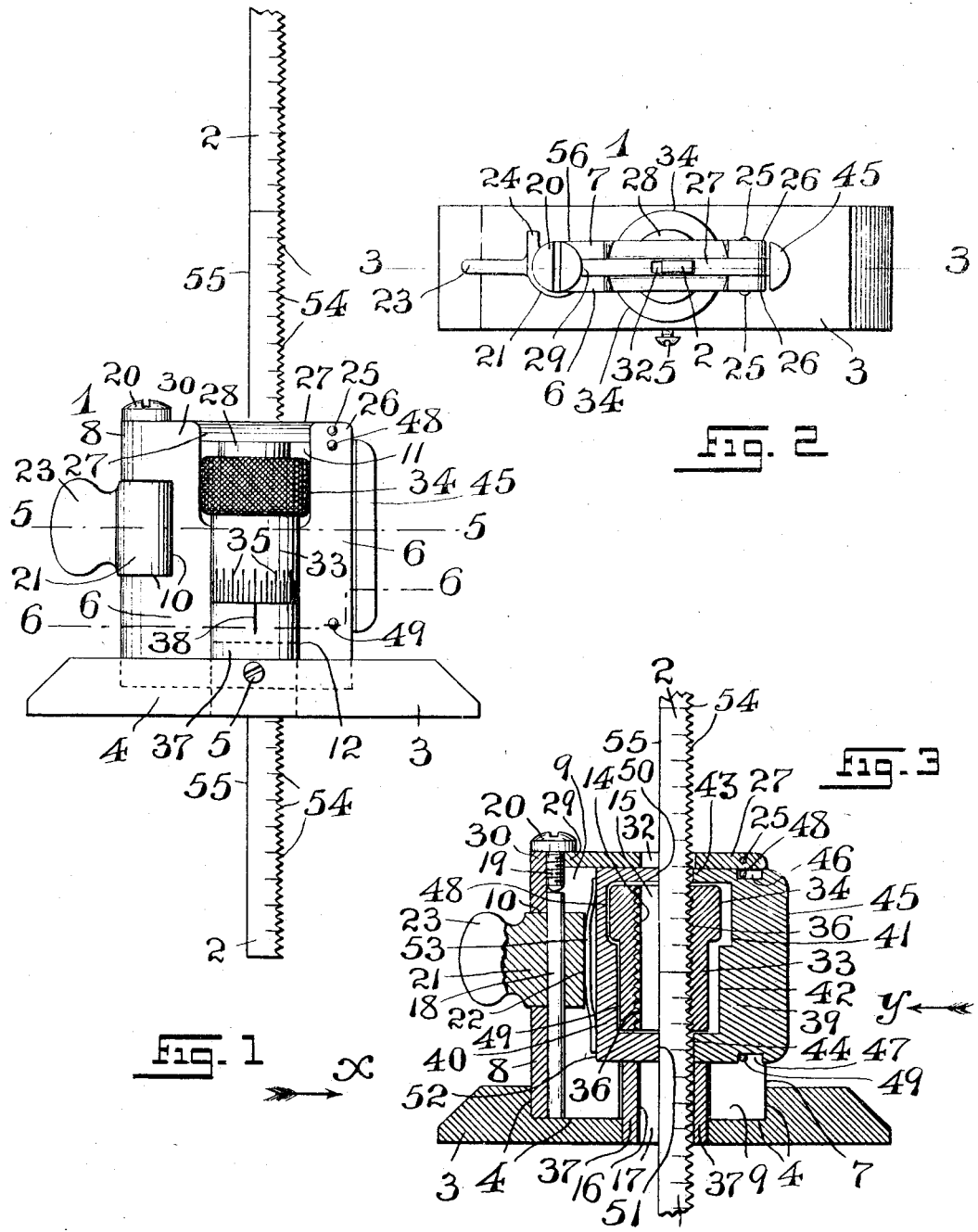
WITNESSES:
Fredk. C. W. Fraentzel
Eva E. Desch
INVENTOR:
Louis Cordier
BY
Fraentzel and Richards,
ATTORNEYS L. CORDIER.
MICROMETER HEAD.
APPLICATION FILED FEB. 26, 1914.
1,105,549.
Patented July 28, 1914.
3 SHEETS—SHEET 2.
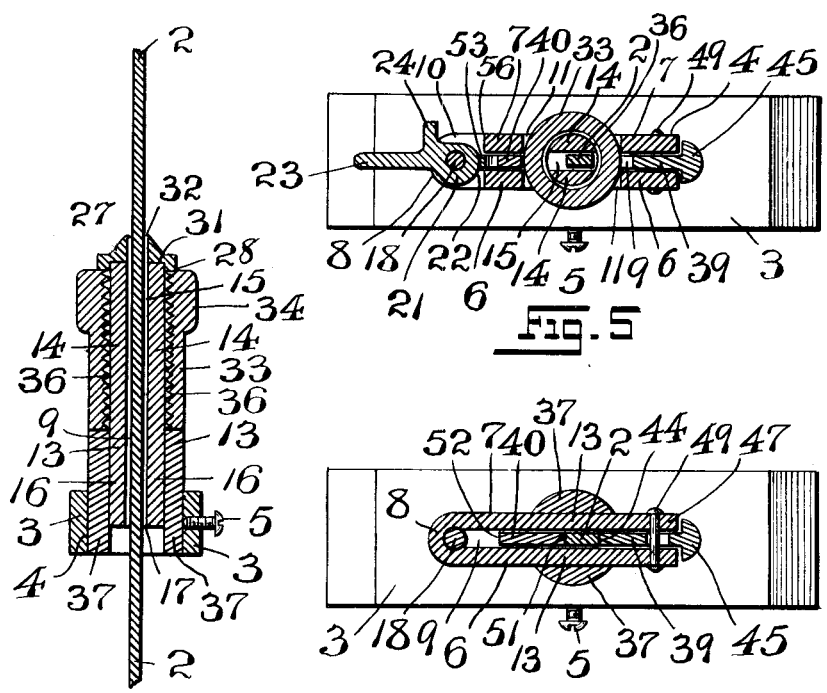
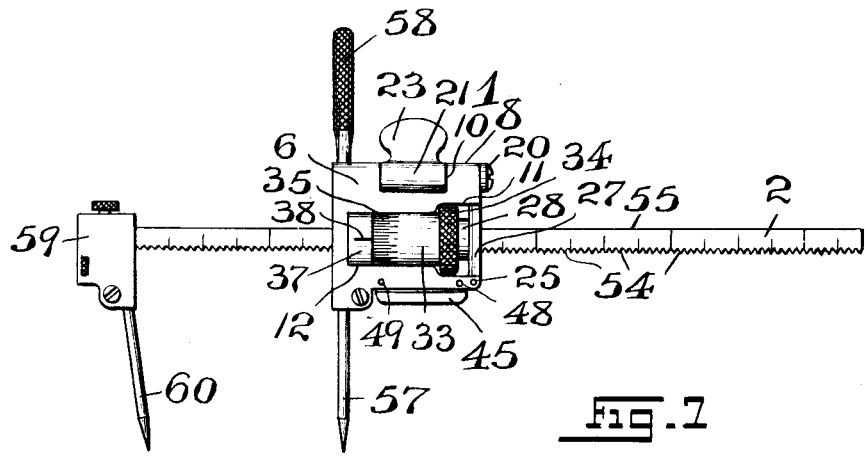
WITNESSES:
Fredk H. W. Fraentzel
Eva E. Desch
INVENTOR:
Louis Cordier,
BY
Fraentzel and Richards
ATTORNEYS

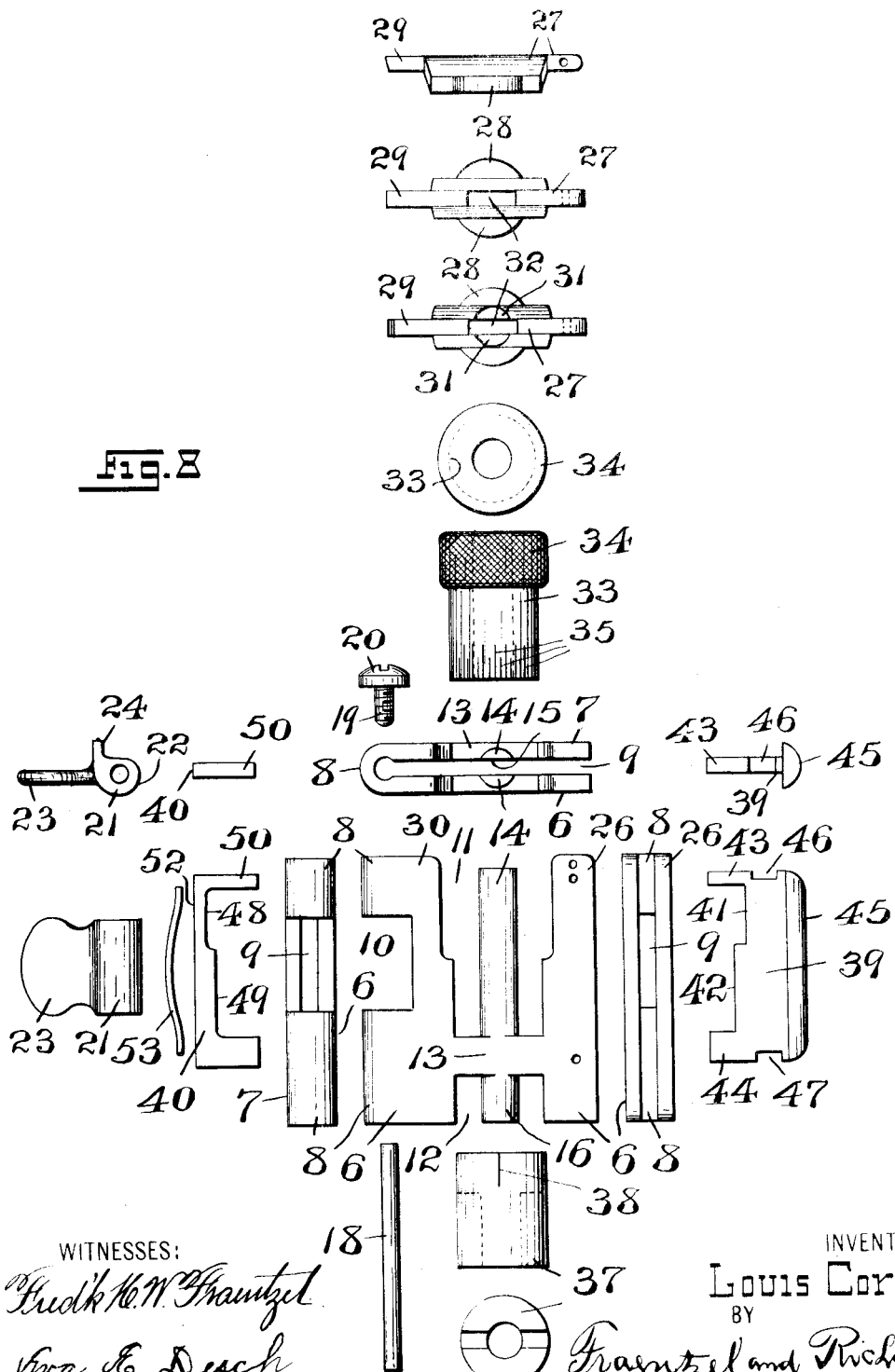

UNITED STATES PATENT OFFICE.

LOUIS CORDIER, OF NEWARK, NEW JERSEY.

MICROMETER-HEAD.

1,105,549.  Specification of Letters Patent.  Patented July 28, 1914.

Application filed February 26, 1914. Serial No. 821,292.

*To all whom it may concern:*

Be it known that I, LOUIS CORDIER, a citizen of the United States, residing at Newark, in the county of Essex and State of New Jersey, have invented certain new and useful Improvements in Micrometer-Heads; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in gaging implements or measuring devices; and, the present invention relates, more particularly, to a novel micrometer-head which is adapted for use in connection with measuring tools of the various kinds for obtaining and maintaining standard dimensions.

My present invention has for its principal object to provide a simply constructed and readily manipulated micrometer head for use with measuring tools or implements of the various kinds, and for the purpose of easily making measurements or plottings to an extreme nicety; and, furthermore, to provide a novel and simply operated locking or clamping mechanism employed with the micrometer cylinder for locking the parts against perceptible movement after taking the principal measurement, but permitting the micrometer cylinder to be moved sufficiently so as to enable the workman to set the gaging implement or tool to an extreme nicety and that any sensible variation in taking measurements will be impossible, so as not to spoil a "fit," and that standard dimensions and measurements may be had.

Other objects of the present invention not at this time more particularly enumerated will be clearly understood from the following detailed description of the present invention.

With the various objects of the present invention in view, the invention consists, primarily, in the novel gaging implement or measuring device, preferably in the form of a micrometer-head, hereinafter set forth; and, the present invention consists, furthermore, in the novel arrangements and combinations of the various devices and parts, all of which will be more fully described in detail in the following specification, and then finally embodied in the clauses of the claim which are appended to and which form an essential part of the said specification.

The invention is clearly illustrated in the accompanying drawings, in which:—

Figure 1 is a front elevation of a gaging implement, in the form of a micrometer head, showing one embodiment of the principles of the present invention, and illustrating the head used in connection with an ordinary scale; and Fig. 2 is a top view of the same. Fig. 3 is a longitudinal vertical section of the implement, said section being taken on line 3—3 in said Fig. 2; and Fig. 4 is a transverse vertical section of the same, taken centrally through the implement. Fig. 5 is a horizontal section taken on line 5—5 in said Fig. 1; and Fig. 6 is a similar section taken on line 6—6 in said Fig. 1. Fig. 7 is a front elevation of a gaging implement also embodying the principles of the present invention, illustrating the use of the micrometer head in connection with a spotting tool. Fig. 8 is a collective view of the various parts of the implement shown more particularly in Figs. 1 to 6 inclusive, except the scale and surface-bed or block, the various parts being represented in mechanical detail.

Similar characters of reference are employed in the said above described views, to indicate corresponding parts.

Referring now to the several figures of the drawings, the reference-character 1 indicates the micrometer-head made according to and embodying the principles of the present invention, one manner of using said head being with a scale, as 2, and the lower portion of the micrometer head being embedded in a recessed part, as 4, of a suitable surface-bed or block 3, substantially as illustrated in Figs. 1 to 6 inclusive, and to which bed or block the head may be secured by means of a suitable screw, as 5. The said micrometer head comprises a main body which consists of a front member or face-plate 6 and a rear-member or back-plate 7, said members 6 and 7 being joined or connected, as at 8, so that the said body is provided with a longitudinally extending open portion, as 9. The said members 6 and 7 and their connecting portion 8 are also cutaway, as at 10, so as to provide a suitable receiving opening for the purpose to be hereinafter more fully specified. The upper portions of said members 6 and 7 are also cutaway, as at 11, and the lower portions of said members 6 and 7 are cut away, as at 12, so as to provide other receiving openings in the upper and lower portions of the said members 6 and 7 and to provide suitable bridge-pieces 13, Fig. 6. Extending upwardly from and integral with said bridge-pieces 13, and into the opening formed by the cut away part 11, are a pair of oppositely placed segmental posts or studs 14, Fig. 5, separated by an open space 15 of the same width and in alinement with the open portion 9 between the said members 6 and 7; and similarly extending downwardly from and integral with the said bridge-piece 13, and into the opening formed by the cut away part 12, are another pair of oppositely placed segmental posts or studs 16, Fig. 4, separated by an open space 17 of the same width and in alinement with the open portion 9 between the said members 6 and 7. The said posts or studs 14 and 16 are arranged in such a manner that each pair of posts or studs will provide a diametrically slotted cylinder, the purposes of said cylinders being presently more fully described. That part of the open space 9, between the said members 6 and 7, and located directly at the connecting portion 8, as shown in Fig. 6, is made somewhat wider than the distance laterally across the space 9, so as to provide suitable receiving bearings for a pin 18, which when arranged in position extends directly across the opening formed by the cut-away portion 10 in said members 6 and 7 and the connecting edge-portion 8. The said pin 18 is tightly driven into said receiving bearings, and is of such length that when driven into place it will be located a short distance below the upper portions of said members 6 and 7 and the said edge-portion 8, substantially as illustrated in Fig. 3 of the drawings. The upper receiving bearing is also screw-threaded, for the reception of a screw 19, having a head 20, and the end of the shank of said screw, when screwed in place, resting directly upon the upper end of said pin 18, as shown. Pivotally mounted upon said pin 18, and arranged in the opening of said space formed by the cutaway parts 10, is a cam-shaped hub 21 having a cam-surface 22, Fig. 5, and said hub being also provided with a suitable fingerpiece, as 23, and an extension or projection 24 which provides a suitable stop. Pivotally mounted upon a pin 25, Figs. 1-3, secured at its ends in the upper corner-portions 26 of said members 6 and 7, and extending across the open portion 9 of said members 6 and 7, is a suitably formed closing plate 27, formed with a central enlargement 28, and a finger-like projection 29 which extends into that part of the open space 9 located between the upper corner-portions 30 of the members 6 and 7, and said finger-like projection 29 extending directly beneath the projecting edge of the head 20 of the screw 19, whereby the said plate 27 is securely retained in its closed relation to the micrometer head, as will be clearly evident. The central enlargement 28 of the said plate 27 is also recessed in its under surface, as at 31, see Fig. 4 of the drawings, so as to be fitted directly over the upper end-portions of the segmental posts or studs 14. The said closing plate 27 is also provided in its enlargement 28 with an elongated opening, as 32, in alinement with and of the same width as the width of the space between said segmental posts or studs 14.

Rotatably mounted upon the diametrically slotted cylindrical post, formed by the two segmental posts or studs 14, and located within the receiving openings formed by the cut away parts 11, and resting upon the upper edge-portions of the bridge-pieces 13 and held in position against displacement by the closed closing plate 27, is a tubular micrometer cylinder 33, said cylinder being provided with a knurled or other suitably formed operating member or finger-piece 34 and being provided also with the usual micrometer reading divisions 35. The inner tubular portion of the said micrometer cylinder 33 is screw-threaded, as at 36. Mounted directly upon the diametrically slotted cylindrical post, formed by the segmental posts or studs 16, and located within the receiving openings formed by the cutaway parts 12, is another tubular hub-like element or member, as 37, the upper portion being diametrically slotted or cut away, so as to embrace the bridge-pieces 13, being snugly fitted thereon, and thus being held against rotative movement upon said posts or studs 16. The said hub-like member or element 37 is also provided with a single micrometer-division 38 with which the previously mentioned divisions 35 can be brought into reading-registration, in the manner usual in micrometer constructions.

Slightly slidably arranged in those portions of the space 9 located between the said members 6 and 7 and the bridge-pieces 13 are a pair of clamping or retaining members 39 and 40 Figs. 3 and 5. The clamping or retaining member 39 is suitably cut away, as at 41 and 42 Fig. 3, and is formed with an upper gripping or binding jaw 43 and a lower gripping or binding jaw 44, and upon that portion of its body, which projects beyond the open space 9 between the members 6 and 7, the said member 39 has a wider marginal portion 45, which is preferably of convex conformation, as shown in Figs. 2, 5 and 6 of the drawings, and serves as a push-piece for the purpose to be hereinafter more fully stated. To limit the sliding movement of said clamping or retaining member 39, and to prevent its displacement from between the said members 6 and 7, the said clamping or retaining member in the upper and lower portions of its body is slotted or cut away, as at 46 and 47, Figs. 3 and 6, suitable pins 48 and 49 having their end-portions suitably secured in the respective members 6 and 7 and extending into and across the respective slots or cut away parts 46 and 47, and the purposes of which will be clearly evident from an inspection of said figures of the drawings. The clamping or retaining member 40 is likewise cut away, as at 48 and 49, and is formed with an upper gripping or binding jaw 50 and a lower gripping or binding jaw 51, and upon its marginal edge-portion 52, there is loosely placed, in the space 9 between the members 6 and 7, a suitably formed bowed spring-plate 53, or other suitably formed spring-element, with the bowed portion of which the cam-surface 22 of the eccentric or cam-shaped hub 21 is in operative engagement, so as to force the ends of said spring-plate 53 against the marginal edge 52 of the clamping or retaining member 40, or to release said spring-plate from its forcible engagement with said edge 52, as may be desired.

In using the herein-above described micrometer-head with the graduated scale 2, the scale which is provided along one of its edge-portions with minute teeth or screw-threadlike projections, as 54, is inserted into and through the elongated opening 32 in the closing plate and arranged in the spaces between said segmental posts or studs 14 and 16 and the bridge-pieces 13, the lower portion of the scale projecting beyond the said posts or studs 14 and from the surface-bed or block 3, substantially in the manner illustrated in Figs. 1, 3 and 4 of the drawings. It will be seen from an inspection of said Figs. 3 and 5, that when the cam-surface 22 of the cam-shaped hub 21 has been moved into its operative contact with the bowed portion of the spring-plate 53, the clamping or retaining member 40 is moved in the direction of the arrow $x$, see Fig. 3, thereby causing the gripping or binding jaws 50 and 51 to be moved against the edge 55 of the scale 2 so as to bring the internally screw-threaded portion of the micrometer cylinder into its operative engagement with the screw-threads or projections 54 of said scale.

Now, in order to take a correct measurement, say of the depth of a hole, by rotating the cam-shaped hub 21 upon the pin 18 until the projection or stop 24 is brought against the edge-portion 56 of the member 7, see Fig. 5 of the drawings, the cam-surface 22 of the said cam-shaped hub 21 is sufficiently released from the bowed portion of the spring-plate 53 so that when pressure is applied upon the edge-portion 45 of the clamping or retaining member 39 it can be moved in the direction of the arrow $y$ in said Fig. 3 of the drawings. This pressure upon said edge-portion 45 of said member 39 will force the jaws 43 and 44 of said member 39 against the screw-threaded edge of the scale 2, whereby said scale is moved laterally in the direction of the said arrow $y$, so that its screw-threaded portion will be disengaged from the internally screw-threaded portion of the tubular micrometer cylinder. The scale 2 can now be moved vertically, either in an upward or a downward direction, as may be necessary, and the main measurement taken by placing the surface-block or base 3 upon the surface provided with the hole, the depth of which is to be measured. This having been accomplished, the pressure is released from the edge-portion 45 of the clamping or retaining member 39, the scale being sufficiently held against movement between the respective gripping or binding jaws 43 and 50, and 54 and 51, as will be evident. By means of its fingerpiece the cam-shaped hub 21 is again rotated into its former position, indicated in said Fig. 5 of the drawings, thus again moving the clamping member 40 in the direction of the arrow $x$, whereby the gripping or binding jaws 50 and 51, bearing against the edge 55 of the scale 2, will move the parts once more into their coöperating relations indicated in said Fig. 3, with the teeth or projections 54 of the scale 2 once more in mesh with the internally screw-threaded portion of the micrometer-cylinder, as shown. The parts are now sufficiently held, the frictional relation between the various gripping jaws of the members 39 and 40 with the opposite edges of the scale 2 permitting the micrometer-cylinder to be sufficiently rotated to make a micrometer-reading, so that the exact measurement can be taken and read, as with the usual micrometer.

Of course it will be clearly understood, that my novel form of micrometer head, as herein-above described may be used with measuring implements or micrometer-gages of the various kinds, and that the surface-bed or base 3 shown in connection with the head illustrated in Figs. 1 to 6 inclusive, while essential with the micrometer-head employed for certain measuring purposes, may be entirely dispensed with, as indicated in Fig. 7 of the drawings, in which figure the micrometer-head is used in connection with a measuring scale, and with other devices, in this instance, such as are used for taking exact measurements of circles, or between centers, or for laying out or plotting purposes. In the tool represented in said Fig. 7 of the drawings, the general construction and operations of the parts of the micrometer-head are the same as those herein-before described, except that the surface-bed or base 3 is omitted, and that the members 6 and 7 are provided with a pointed centering pin or stem, as 57, and with an operating stem or handle, as 58, the scale 2 being provided upon its one end-portion with a block 59 with which is connected another centering pin or stem, as 60.

I am fully aware that changes may be made in the general arrangements and combinations of the various devices and parts, as well as in the details of the construction of the said parts, without departing from the scope of the present invention as set forth in the foregoing specification, and as defined in the clauses of the claim which are appended to the said specification. Hence, I do not limit my present invention to the exact arrangements and combinations of the various devices and parts as described in the said specification, nor do I confine myself to the exact details of the construction of the said parts, as illustrated in the accompanying drawings.

I claim:—

1. A micrometer head comprising a pair of body-members having a receiving space between them, a tubular micrometer cylinder rotatably connected with said body-members, a scale extending through said receiving space and movably disposed in said micrometer cylinder, and a clamping means in said receiving space adapted to be brought into engagement with the scale for moving said scale into its operative engagement with said micrometer-cylinder.

2. A micrometer head comprising a pair of body-members having a receiving space between them, a tubular micrometer cylinder rotatably connected with said body-members, a scale extending through and movably disposed in said micrometer cylinder, a clamping means in said receiving space adapted to be brought into engagement with the scale for moving said scale into its operative engagement with said micrometer-cylinder, and means also arranged in said receiving space for moving said scale out of its operative engagement with said micrometer-cylinder.

3. A micrometer head comprising a pair of body-members having a receiving space between them, a tubular micrometer cylinder rotatably connected with said body-members, a scale extending through and movably disposed in said micrometer cylinder, a clamping element in said receiving space, and a cam-member pivotally connected with said body-members coöperating with said clamping element for bringing said scale into operative engagement with said micrometer cylinder.

4. A micrometer head comprising a pair of body-members having a receiving space between them, a tubular micrometer cylinder rotatably connected with said body-members, a scale extending through and movably disposed in said micrometer cylinder, a clamping element in said receiving space, a cam-member pivotally connected with said body-members coöperating with said clamping element for bringing said scale into operative engagement with said micrometer cylinder, and means also arranged in said receiving space for moving said scale out of its operative engagement with said micrometer-cylinder.

5. A micrometer head comprising a pair of body-members having a receiving space between them, a tubular micrometer cylinder rotatably connected with said body-members, a scale extending through and movably disposed in said micrometer cylinder, a clamping element in said receiving space, a spring-plate in engagement with said clamping element, and a cam-member pivotally connected with said body-members coöperating with said spring-plate and said clamping element for bringing said scale into operative engagement with said micrometer cylinder.

6. A micrometer head comprising a pair of body-members having a receiving space between them, a tubular micrometer cylinder rotatably connected with said body-members, a scale extending through and movably disposed in said micrometer cylinder, a clamping element in said receiving space, a spring-plate in engagement with said clamping element, and a cam-member pivotally connected with said body-members coöperating with said spring-plate and said clamping element for bringing said scale into operative engagement with said micrometer cylinder, and means also arranged in said receiving space for moving said scale out of its operative engagement with said micrometer-cylinder.

7. A micrometer head comprising a pair of body-members having a receiving space between them, a pair of clamping members slidably disposed in said space, a tubular micrometer cylinder rotatably mounted between said clamping members, a scale extending through and movably disposed in said micrometer cylinder, gripping jaws extending from said clamping members, and means coöperating with said clamping members for causing the binding relation of said jaws with the opposite-edges of said scale and the operative engagement of said scale with the micrometer cylinder.

8. A micrometer head comprising a pair of body-members having a receiving space between them, a pair of clamping members slidably disposed in said space, a tubular micrometer cylinder rotatably mounted between said clamping members, a scale extending through and movably disposed in said micrometer cylinder, gripping jaws extending from said clamping members, and a cam-member pivotally connected with said body-members, coöperating with said clamping members for causing the binding relation of said jaws with the opposite edges of said scale and the operative engagement of said scale with the micrometer cylinder.

9. A micrometer head comprising a pair of body-members having a receiving space between them, a pair of clamping members slidably disposed in said space, a tubular micrometer cylinder rotatably mounted between said clamping members, a scale extending through and movably disposed in said micrometer cylinder, gripping jaws extending from said clamping members, a spring-plate in engagement with one of said clamping members, and a cam-member pivotally connected with said body-member coöperating with said spring-plate and said clamping members for causing the binding relation of said jaws with the opposite edges of said scale and the operative engagement of said scale with the micrometer cylinder.

10. A micrometer head comprising a pair of body-members having a receiving space between them and formed with upper and lower cut-away parts to provide bridge-pieces, a pair of segmental posts extending upwardly from said bridge-pieces, a micrometer cylinder rotatably mounted upon said posts, another pair of segmental posts extending downwardly from said bridge-pieces, a hub-like element mounted upon said second pair of posts, said hub-like element having portions embracing said bridge-pieces, a scale movably disposed between the said pairs of segmental posts, and a clamping means in said receiving space adapted to be brought into engagement with the scale for moving said scale into its operative engagement with said micrometer-cylinder.

11. A micrometer head comprising a pair of body-members having a receiving space between them and formed with upper and lower cut-away parts to provide bridge-pieces, a pair of segmental posts extending upwardly from said bridge-pieces, a micrometer cylinder rotatably mounted upon said posts, another pair of segmental posts extending downwardly from said bridge-pieces, a hub-like element mounted upon said second pair of posts, said hub-like element having portions embracing said bridge-pieces a scale movably disposed between the said pairs of segmental posts, a clamping means in said receiving space adapted to be brought into engagement with the scale for moving said scale into its operative engagement with said micrometer-cylinder, and means also arranged in said receiving space for moving said scale out of its operatve engagement with said micrometer-cylinder.

12. A micrometer head comprising a pair of body-members having a receiving space between them and formed with upper and lower cut-away parts to provide bridge-pieces, a pair of segmental posts extending upwardly from said bridge-pieces, a micrometer cylinder rotatably mounted upon said posts, another pair of segmental posts extending downwardly from said bridge-pieces, a hub-like element mounted upon said second pair of posts, said hub-like element having portions embracing said bridge-pieces, a scale movably disposed between the said pairs of segmental posts, a clamping means in said receiving space, and a cam-member pivotally connected with said body-members coöperating with said clamping element for bringing said scale into operative engagement with said micrometer cylinder.

13. A micrometer head comprising a pair of body-members having a receiving space between them and formed with upper and lower cut-away parts to provide bridge-pieces, a pair of segmental posts extending upwardly from said bridge-pieces, a micrometer cylinder rotatably mounted upon said posts, another pair of segmental posts extending downwardly from said bridge-pieces, a hub-like element mounted upon said second pair of posts, said hub-like element having portions embracing said bridge-pieces, a scale movably disposed between the said pairs of segmental posts, a clamping means in said receiving space, and a cam-member pivotally connected with said body-members coöperating with said clamping element for bringing said scale into operative engagement with said micrometer cylinder, and means also arranged in said receiving space for moving said scale out of its operative engagement with said micrometer-cylinder.

14. A micrometer head comprising a pair of body-members having a receiving space between them and formed with upper and lower cut-away parts to provide bridge-pieces, a pair of segmental posts extending upwardly from said bridge-pieces, an internally screw-threaded micrometer cylinder rotatably mounted upon said posts, another pair of segmental posts extending downwardly from said bridge-pieces, a hub-like element mounted upon said second pair of posts, said hub-like element having portions embracing said bridge-pieces, a scale provided with screw-threads upon one of its edges movably disposed between said segmental posts, a pair of clamping members slidably disposed in said receiving space and located upon opposite sides of said micrometer cylinder, gripping jaws extending from said clamping members, and means coöperating with said clamping members for causing the binding relation of said jaws with the opposite edges of said scale and the operative engagement of the screw-threaded portion of the scale with the screw-threads of the micrometer cylinder.

15. A micrometer head comprising a pair of body-members and a connecting edge-portion, said body-members having a receiving space between them and forming with said edge-portion a pair of bearings, one of said bearings having an internally screw-threaded part, a pin in said bearings, and a headed screw in the screw-threaded part of the one bearing, said body-members being formed with upper and lower cutaway parts to provide bridge-pieces, a closing plate pivoted in the upper part of said receiving space, said closing plate being provided with an elongated hole and having a portion extending under the head of said screw, a pair of segmental posts extending upwardly from said bridge-pieces, an internally screw-threaded micrometer cylinder rotatably mounted upon said posts, another pair of segmental posts extending downwardly from said bridge-pieces, a hub-like element mounted upon said second pair of posts, said hub-like element having portions embracing said bridge-pieces, a scale provided with screw-threads upon one of its edges, said scale extending into and through the hole in said closing plate and being movably disposed between said segmental posts, a pair of clamping members slidably disposed in said receiving space and located upon opposite sides of said micrometer cylinder, gripping jaws extending from said clamping members, and means coöperating with said clamping members for causing the binding relation of said jaws with the opposite edges of said scale and the operative engagement of the screw-threaded portion of the scale with the screw-threads of the micrometer cylinder.

In testimony, that I claim the invention set forth above I have hereunto set my hand this 21st day of February, 1914.

LOUIS CORDIER.

Witnesses:
 FRED D. FRAENTZEL,
 FREDK. H. W. FRAENTZEL.